No. 735,321. PATENTED AUG. 4, 1903.
F. WALKER.
COMBINED SOLAR AND ARTIFICIAL HEAT WATER HEATER.
APPLICATION FILED SEPT. 2, 1902.
NO MODEL.
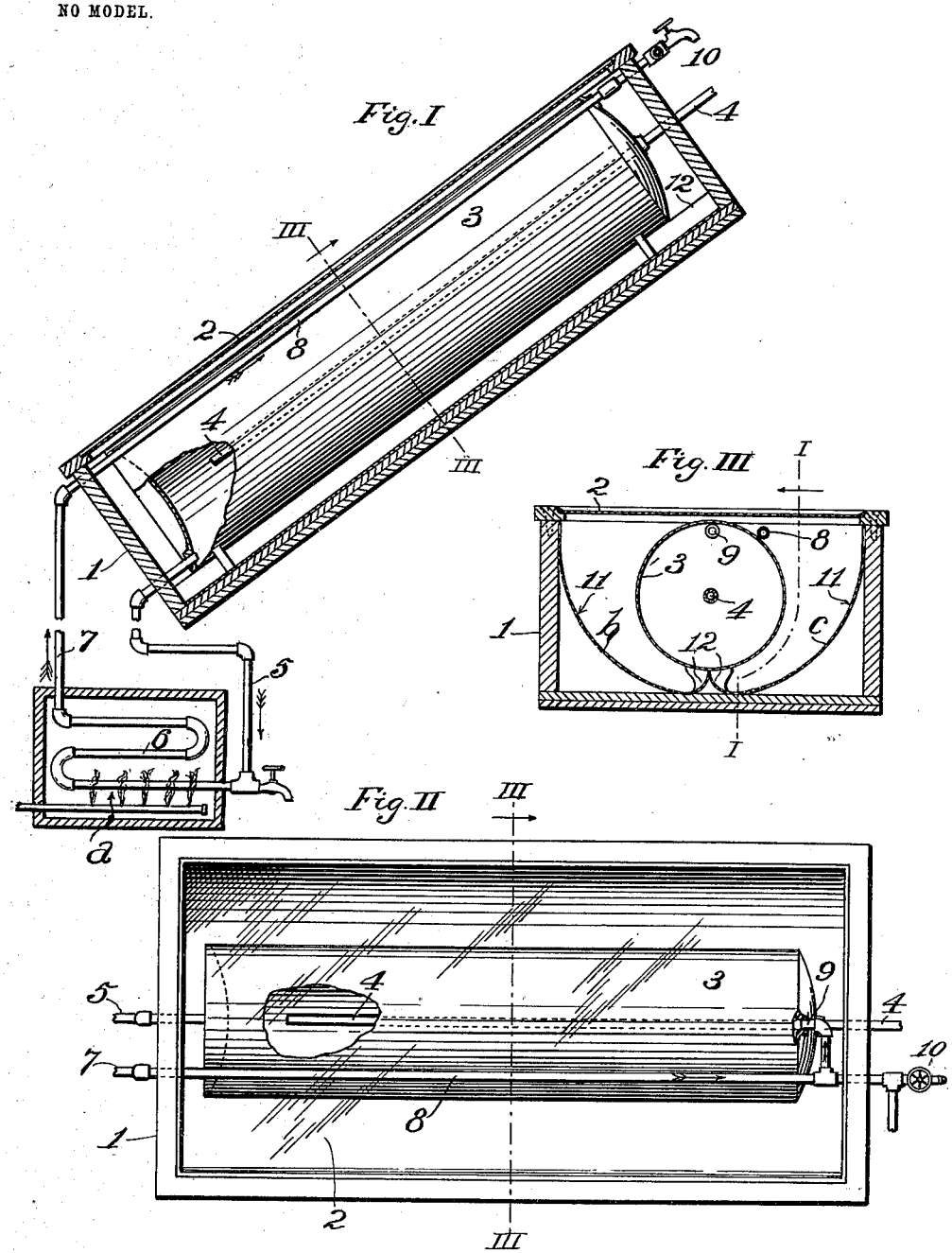
Witnesses
C. C. Holly
I. Townsend
Inventor
Frank Walker
by Townsend Bro
his attys.

No. 735,321.

Patented August 4, 1903.

UNITED STATES PATENT OFFICE.

FRANK WALKER, OF LOS ANGELES, CALIFORNIA.

COMBINED SOLAR AND ARTIFICIAL HEAT WATER-HEATER.

SPECIFICATION forming part of Letters Patent No. 735,321, dated August 4, 1903.

Application filed September 2, 1902. Serial No. 121,905. (No model.)

*To all whom it may concern:*

Be it known that I, FRANK WALKER, a citizen of the United States, residing at Los Angeles, in the county of Los Angeles and State of California, have invented a new and useful Improvement in a Combined Solar and Artificial Heat Water-Heater, of which the following is a specification.

This invention relates to improvements on a certain combined solar and artificial heat water-heater patented to me on the 22d day of July, 1902, No. 605,167.

Objects of this invention are as follows: first, superior economy of the sun's rays for a determined size of solar case; second, facility of producing circulation in the apparatus upon starting the artificial heater into operation.

In my said patent I show the return member passing up through a chimney-flue for the purpose of obtaining this second object; but it is sometimes impracticable or inconvenient to so arrange the return member, and a purpose of this invention is to provide means in addition to the stove or analogous artificial heater for heating a portion of the return member without passing the pipe up through a heated flue. This invention dispenses with said flue by passing a portion of the return member up through the solar case, thereby adapting the invention for ready use with an ordinary domestic gas-heater, as well as any other form of heater, and also producing a circulation through the system when the supplementary heater is not in operation.

The accompanying drawings illustrate the invention.

Figure I is an elevation of apparatus embodying the invention, portions being broken away for clearness and to contract the view, the solar case being shown in section on line I I of Fig. III. Fig. II is a plan of the solar heater-case with range-boiler and reflectors therein. Fig. III is a sectional elevation on line III III of Fig. II.

1 is an ordinary solar heater-case having the usual transparent portion 2.

3 is the usual receptacle, preferably a range-boiler.

4 is the liquid-supply pipe or main.

5, 6, and 7 designate three parts of the circulating-pipe for the artificial heater *a*, which may be a burner of any form, arranged to heat the ascending or return member of the circulating-pipe.

8 is a limb or portion of the return member of the circulating-pipe, which enters the solar heater-case 1 at the lower part and extends upward through the case at a portion of the case where it will be heated by the sun's rays, and the same is connected at 9 with the top of the receptacle. The limb 8 desirably lies against the upper side of the boiler, so as to be heated by the sun's rays and by the hottest water in the boiler, thus causing the liquid in the limb 8 to normally be hotter than that in the boiler or other parts of the circulating-pipe whenever the liquid in the boiler is heated. 10 represents a service-pipe through which the hot water may be drawn from the receptacle.

The service-pipe 10 may be connected with the receptacle in any suitable way. Desirably it is connected by a portion of the circulating-pipe, as indicated in Fig. II.

11 is a reflector arranged in the solar heater-case and extending parallel with the boiler 3, and 12 designates means extending along beneath the boiler between the opposite sides *b c* of the reflector to intercept the reflected rays of the sun and prevent them from being finally reflected from the case—that is to say, so far as I am aware there has heretofore been a considerable loss of heat by reason of the escape of reflected rays which have passed into the heater-case and after being reflected to a point underneath the boiler have passed on through to the other side and thence have been reflected out through the transparent portion again. By placing the interceptor 12 along the mid-line of the boiler, as shown, these rays are intercepted underneath the boiler and are directed to heat the boiler, so that there is no escape of the heat from the case by reflection.

In practical operation whenever the liquid, or a portion thereof, in the receptacle 3 is heated either by the solar heater or otherwise the liquid in the inclined limb 8 of the return member of the circulating-pipe will be kept hotter, and consequently lighter, than that in the under side of the boiler and in the descending member 5 of the circulating-pipe, so that whenever heat is applied to the bend 6 to heat the liquid in the ascending member 7 circulation through the boiler and circulating-pipe in the direction of the arrows in Fig. I is readily set up.

The receptacle 3 and circulating-pipe will be constantly filled under pressure from the main or supply pipe 4, and the hottest water in the system may always be drawn through the service-pipe 10, which leads from the upper end of the limb 8, so that the hottest water, whether from said limb or from the boiler, will be supplied thereto when the same is opened.

It is to be observed that with this new appliance a circulation will be induced through the pipe members 5 6 7 whenever the pipe member 8 in the solar case is heated by the sun's rays, and this regardless of whether the supplementary heater $a$ is or is not in operation.

Now, having described my invention, what I claim, and desire to secure by Letters Patent of the United States, is—

1. A solar heater, a receptacle therein connected with a supply and with a service pipe, a circulating-pipe leading from the lower portion of the receptacle and down from the case, and furnished with a bend and thence returned up and into the case and extending up through a portion of the case in a position where it will be heated by the sun's rays in the case, and connected with the upper end of the receptacle to discharge thereinto, and a supplementary heater to heat the return member of the circulating-pipe above the bend.

2. A solar heater-case having a transparent panel, a range-boiler in the case, a reflector parallel with the range-boiler and arranged at the sides of the case and opposite the transparent panel, and an interceptor arranged underneath the boiler to intercept the rays of the sun and direct them to heat the boiler.

3. A solar heater-case, a range-boiler aslant in the case, a supply-pipe for supplying the range-boiler with liquid under pressure, a circulating-pipe leading downward from the range-boiler and case, and bent and returned upward and leading into the case and along the upper side of the range-boiler, to and entering into the end of said boiler, whereby a portion of the inclined limb of the upper end of the return member may be normally kept heated by the heated water of the boiler.

4. A solar heater-case having a transparent portion to admit the sun's rays, a receptacle in the case, a reflector arranged at the sides of the case and opposite the transparent portion, and means underneath the receptacle between opposite sides of the reflector to prevent the sun's rays from passing across beneath the receptacle.

5. A solar heater-case, a receptacle therein set on an incline and connected with a supply-pipe, a circulating-pipe leading from the lower portion of the receptacle and bent and returned up through a portion of the case on an incline to be heated by the sun's rays and opening into the receptacle, and a service-pipe joined to the system.

In testimony whereof I have signed my name to this specification, in the presence of two subscribing witnesses, at Los Angeles, in the county of Los Angeles and State of California, this 26th day of August, 1902.

FRANK WALKER.

Witnesses:
JAMES R. TOWNSEND,
F. M. TOWNSEND.